(12) United States Patent
Wubs

(10) Patent No.: US 7,593,056 B2
(45) Date of Patent: Sep. 22, 2009

(54) INFRARED VISION ILLUMINATION ENHANCEMENT

(75) Inventor: Leonard W. Wubs, Surrey (CA)

(73) Assignee: Honeywell International Inc., Morristown, NJ (US)

( * ) Notice: Subject to any disclaimer, the term of this patent is extended or adjusted under 35 U.S.C. 154(b) by 801 days.

(21) Appl. No.: 10/974,337

(22) Filed: Oct. 27, 2004

(65) Prior Publication Data

US 2006/0087583 A1 Apr. 27, 2006

(51) Int. Cl.
*H04N 5/222* (2006.01)
*H04N 7/18* (2006.01)

(52) U.S. Cl. ............... 348/370; 348/371; 348/143; 348/131

(58) Field of Classification Search ......... 348/370–371, 348/162, 164, 360; 362/276
See application file for complete search history.

(56) References Cited

U.S. PATENT DOCUMENTS 3,748,383 A * 7/1973 Grossman ............... 348/164

| | | | | |
|---|---|---|---|---|
| 2003/0043287 A1* | 3/2003 | Kakiuchi et al. | ............ | 348/269 |
| 2003/0062413 A1* | 4/2003 | Gardiner et al. | ............ | 235/454 |
| 2004/0012715 A1* | 1/2004 | Gin | ........................... | 348/375 |
| 2004/0051061 A1* | 3/2004 | Warner | ................... | 250/559.44 |
| 2004/0105264 A1* | 6/2004 | Spero | ......................... | 362/276 |
| 2005/0100191 A1* | 5/2005 | Harbach et al. | ............ | 382/103 |

* cited by examiner

*Primary Examiner*—Tuan V Ho
*Assistant Examiner*—Euel K Cowan
(74) *Attorney, Agent, or Firm*—Husch Blackwell Sanders Welsh & Katz

(57) ABSTRACT

A camera and illuminator combination unit has a camera to generate images within a predetermined field of view, the field of view having a central axis, and an illuminator having an illumination axis, the illumination axis being non-parallel with the central axis. Alternately, a camera and illuminator combination unit has a camera to generate images within a predetermined field of view including areas of different distance from the unit and an illuminator having an illumination axis directed towards a distant portion of the field of view.

13 Claims, 4 Drawing Sheets

Relative Radiant Intensity vs. Angular Displacement

INFRARED VISION ILLUMINATION ENHANCEMENT

BACKGROUND OF THE INVENTION

1. Field of Invention

The invention relates generally to the field of cameras and of illumination devices, and more particularly to a camera having an integrated illumination device adapted for enhanced illumination.

2. Description of Related Art

Cameras, particularly video cameras used in surveillance applications, may be provided with illuminators to provide adequate light for the camera to produce a discernable image. In certain applications, the camera can detect infrared light not visible to the naked eye. Accordingly, infrared light may be provided by an illuminator, allowing the camera to image the scene across both the infrared and visible spectra without producing visible light. Generally, the illuminators are positioned to direct light along an illumination axis parallel to the central axis of the camera.

There are, however, certain problems with such arrangements. First, light intensity falls off as the square of distance. This presents a problem when the camera is positioned to image a field of view that includes various depths. As the intensity of the illumination is increased to provide adequate light for the distant areas within the field of view, the high intensity light in the areas closer to the camera overloads the image, whereby any light reflected from the closer areas is at maximum intensity, eliminating any contrast in that portion of the image and producing a phenomenon called "washout".

Second, light intensity also falls off as the position deviates from the illumination axis. Referring to FIG. 4, illustrated is a polar plot of relative radiant intensity v. angular displacement for a typical LED illuminator. The illustrated illuminator produces a cone of light, defined by the cone angle between the illumination axis and a certain light intensity threshold. For example, the illuminator graphed in FIG. 4 demonstrates a cone of approximately 20° to either side of a central illumination axis in the region nearest the source. This illuminator could be described by the cone angle it produces, i.e. 20°.

This characteristic of certain illuminators contributes to the washout phenomenon, particularly by creating a "hotspot", or a central area of the image where in illumination overloads the camera's ability to produce an image. In the alternative, if the illumination intensity is reduced to control the hotspot and washout, the light is insufficient to create a discernable image in the areas distant from the camera.

BRIEF SUMMARY OF THE INVENTION

In order to overcome these and other disadvantages in the prior art, provided according to the present invention is a camera and illuminator combination unit having a camera to generate images within a predetermined field of view, the field of view defined with respect to a central axis, and an illuminator having an illumination axis, the illumination axis being non-parallel with the central axis. Also provided according to the present invention is a camera and illuminator combination unit having a camera to generate images within a predetermined field of view including areas of different distance from the unit and an illuminator having an illumination axis directed towards a distant portion of the field of view.

Further, according to the present invention, a unit has a plurality of illuminators. At least one illumination axis of the plurality is non-parallel with respect to another illumination axes. The illuminators may be one or more of LEDs, incandescent elements, fluorescent elements, or chemiluminescent elements.

Further, according to the present invention, the illuminator may emit energy in a predetermined and limited range of the EM spectrum, specifically, the infrared portion of the EM spectrum, and more specifically the near-infrared portion of the EM spectrum. The camera may be operative to detect energy in a predetermined and limited range of the EM spectrum, specifically, the infrared portion of the EM spectrum, and more specifically the near-infrared portion of the EM spectrum.

Further, according to the present invention, an enclosure has a window admitting light energy to or from the illuminator or camera. The window may be a void of enclosure material, or a material transparent to energy within a predetermined portion of the EM spectrum. Additionally, the window may filter energy outside a predetermined portion of the EM spectrum.

BRIEF DESCRIPTION OF THE DRAWINGS

These and other features, benefits, and advantages of the present invention will be made apparent by the following specification and accompanying figures, where like numerals represent like structures across the several views, and wherein.

DETAILED DESCRIPTION OF THE INVENTION

Figure 1:
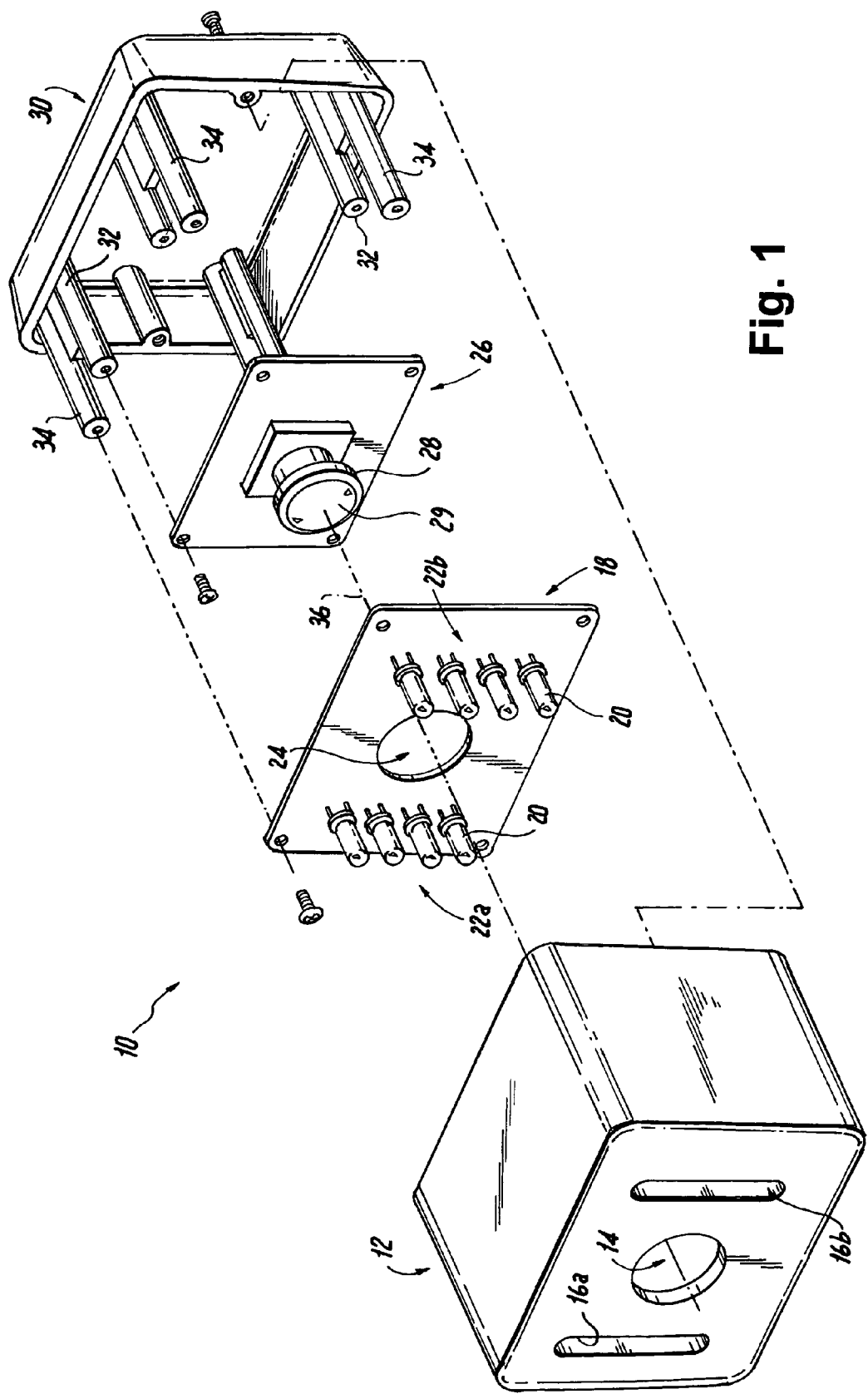
FIG. 1 illustrates an apparatus according to an exemplary embodiment of the present invention in exploded assembly view.

Referring now to FIG. 1, illustrated in exploded assembly view is a camera and illuminator combination unit, generally 10, according to one embodiment of the present invention. The unit 10 has an outer enclosure 12, which has a camera window 14, and one or more illuminator windows 16a, 16b. Camera window 14 and illuminator windows 16a, 16b may be void of enclosure material, as in the exemplary embodiment. Alternately, the windows may be of a material that is transparent to at least the wavelengths of light emitted by respective illuminators 20 or detected by camera 28, at least to the extent the outer enclosure 12 is itself opaque to such wavelengths. Additionally, windows 14, 16a, 16b may include filters that are translucent to polarized and/or predetermined wavelengths of light. Each of camera window 14 and illuminator windows 16a, 16b are sized and positioned to accommodate respective camera 28 and illuminators 20.

Within outer enclosure 12 is an illuminator board 18, having one or more illuminators 20, which may be arranged into one or more banks 22a, 22b. In the exemplary embodiment, illuminators 20 are LEDs, though other light sources including incandescent, fluorescent, or chemiluminescent sources may be suitable. Illuminators 20 may be capable of continuous illumination or provide flashes of illumination associated with operation of camera 28 in a manner generally known in the imaging art.

Illuminators 20 in the exemplary embodiment produce light primarily localized to the near-infrared portion of the EM spectrum, i.e., approximately 850 nm wavelength, though other wavelengths may be selected. At least one advantage of imaging and illuminating in the infrared portion of the EM spectrum is that a clear image may be gathered from the infrared spectrum in the absence of visible light conditions. Moreover, infrared illumination may be provided without unduly alerting those in the vicinity of the unit to its presence, or unduly distracting occupants of the enclosure or those in the vicinity of the unit by the illumination.

Illuminator board 18 may also carry circuitry (not shown) associated with the operation of illuminators 20, e.g., power supply and/or distribution, on/off control, intensity control, off-board connectors, etc., in the form of solid state and/or integrated circuitry components. Illuminator board 18 also has a through hole 24 to admit camera 28 to provide a more compact unit 10.

Adjacent the illuminator board 18 is the camera board 26. Camera 28 is mounted on camera board 26. Additionally, circuitry (not shown) associated with the operation of camera 28, e.g., power supply and/or distribution, control relative to the camera 26 and/or illuminators 20, off-board connectors, etc., in the form of solid state and/or integrated circuitry components, may be mounted on camera board 26. Also shown is base unit 30, to which each of the camera board 28, illuminator board 18, and outer enclosure 12 may be secured. In the exemplary embodiment, camera board 26 is mounted to posts 32, and illuminator board 18 is mounted to posts 34. Camera 28 defines a longitudinal central axis 36 as the center of the field of view 40 (see FIG. 2) of the camera 28.

Figure 2:
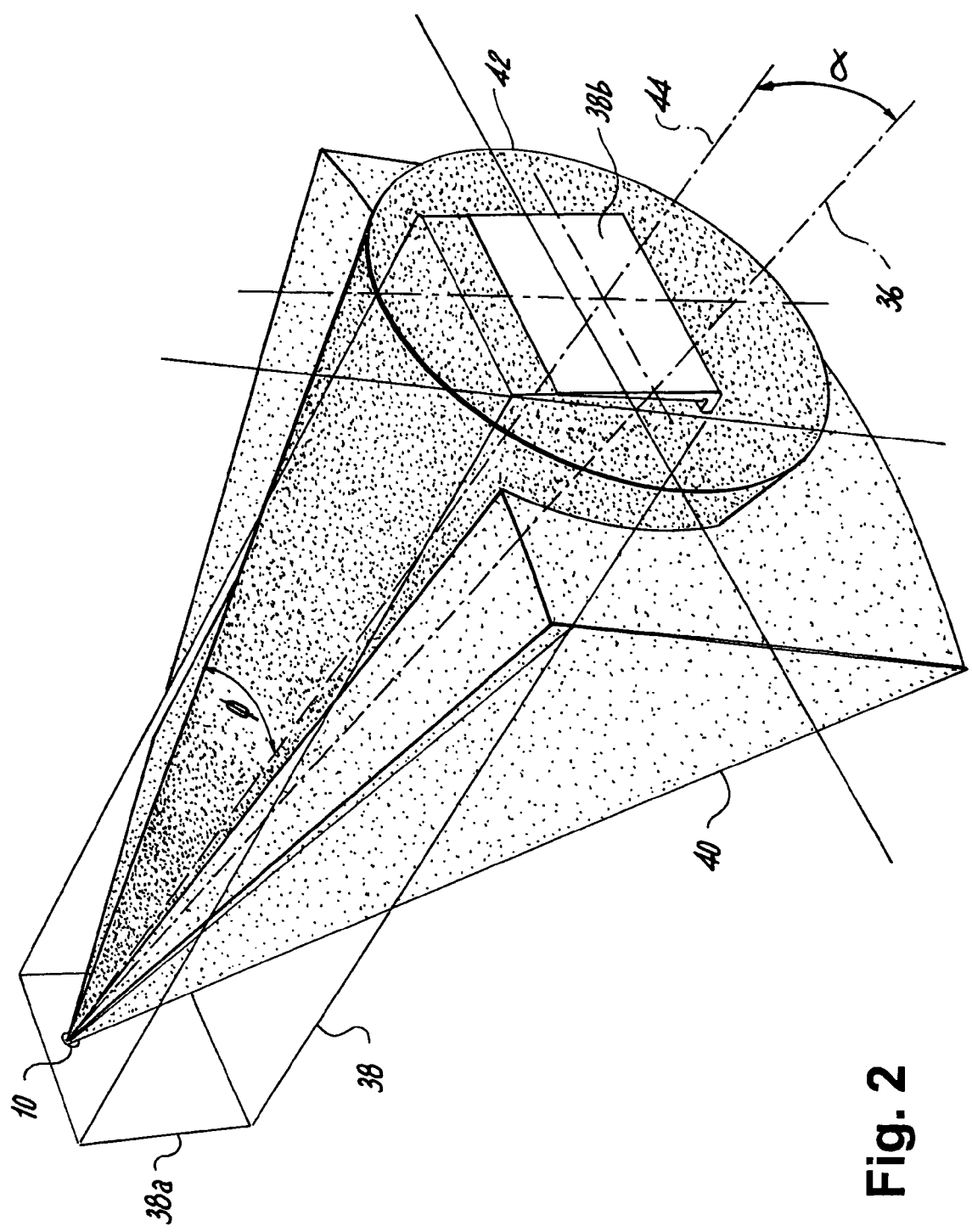
FIG. 2 illustrates schematically the exemplary embodiment in at least one contemplated application thereof.

Referring now to FIG. 2, illustrated in schematic form is the unit 10 in one contemplated application. The unit 10 is mounted in a central elevated position along a first wall 38*a* of an elongated rectangular enclosure 38 to be imaged. Enclosure 38 represents the interior of a motor coach bus, rail car, hallway, or other area of similar proportions, though other applications and geometrical fields will be apparent in light of the instant disclosure. Rectangular cone 40 represents the field of view of the camera 28, which is defined by the central axis 36. The height and width of rectangular cone 40 is defined by the properties of lens 29 in the camera 28. Table 1, below, details the angle properties of a sampling of lenses that may be used in conjunction with the present invention. In the exemplary embodiment, an 8 mm lens is used.

Theoretically, the camera's field of view has no limit in its distance from the unit 10, but it is practically limited by the resolution of the camera 26, and specifically the ability of the camera 26 to discriminate objects distant from the unit 10. In the exemplary embodiment, the length of the enclosure 38 is on the order of about 40 feet, and the camera 26 provides adequate resolution to discern persons, faces, modest sized objects, etc., within that range. Of course, the effective distance of the camera's field of view varies with its resolution.

Circular cone 42 represents the area illuminated by illuminators 20. Circular cone 42 is defined by an illumination axis 44 and a cone angle phi ($\phi$). The circular cone 42 may be wider that, the same width as, or as in the exemplary embodiment, narrower than rectangular cone 40. The cone angle ($\phi$) is determined by the illuminator 20. The length of the circular cone 42 represents the effective area of the illuminators 20, i.e., the distance over which they provide light sufficient for the camera to detect an image. This is particular to the illuminators 20, and is chosen to match the application, for example the size of the enclosure 38.

In the exemplary embodiment, the unit 10, and particularly camera 28, will be positioned such that the rectangular cone 40 achieves a maximum coverage within the enclosure 38. Typically, this places the rectangular cone 40 laterally centered within the enclosure and angled vertically downward, as shown in FIG. 2. According to one embodiment of the present invention, the illumination axis 44 forms a divergence angle gamma ($\gamma$) with the central axis 36. At this scale, central axis 36 and illumination axis 44 are considered to converge at the unit 10. However, as seen with regard to FIG. 1, central axis 36 and illumination axis 44 may not converge, but rather may skew relative to one another. Therefore, it will be seen that central axis 36 and illumination axis 44 need not converge. In an alternate embodiment, the illuminators 20 may be provided in a unit separate from the unit 10 including the camera 26.

In the exemplary embodiment of the present invention, the illumination axis 44 is centered on a most distant portion of the area to be imaged, namely a far wall 38*b* of the enclosure 38. Accordingly, the light intensity in the most distant portion is maximized for the location of the unit 10. Illumination is adequate for imaging in areas nearer the unit 10 because light intensity increases with the square distance nearer the illuminators 20, which compensates for the angular deflection from the illumination axis 44. Additionally, scattering light in the region closer to the unit 12 would provide adequate illumination in the areas nearer the unit 10.

Figure 3:
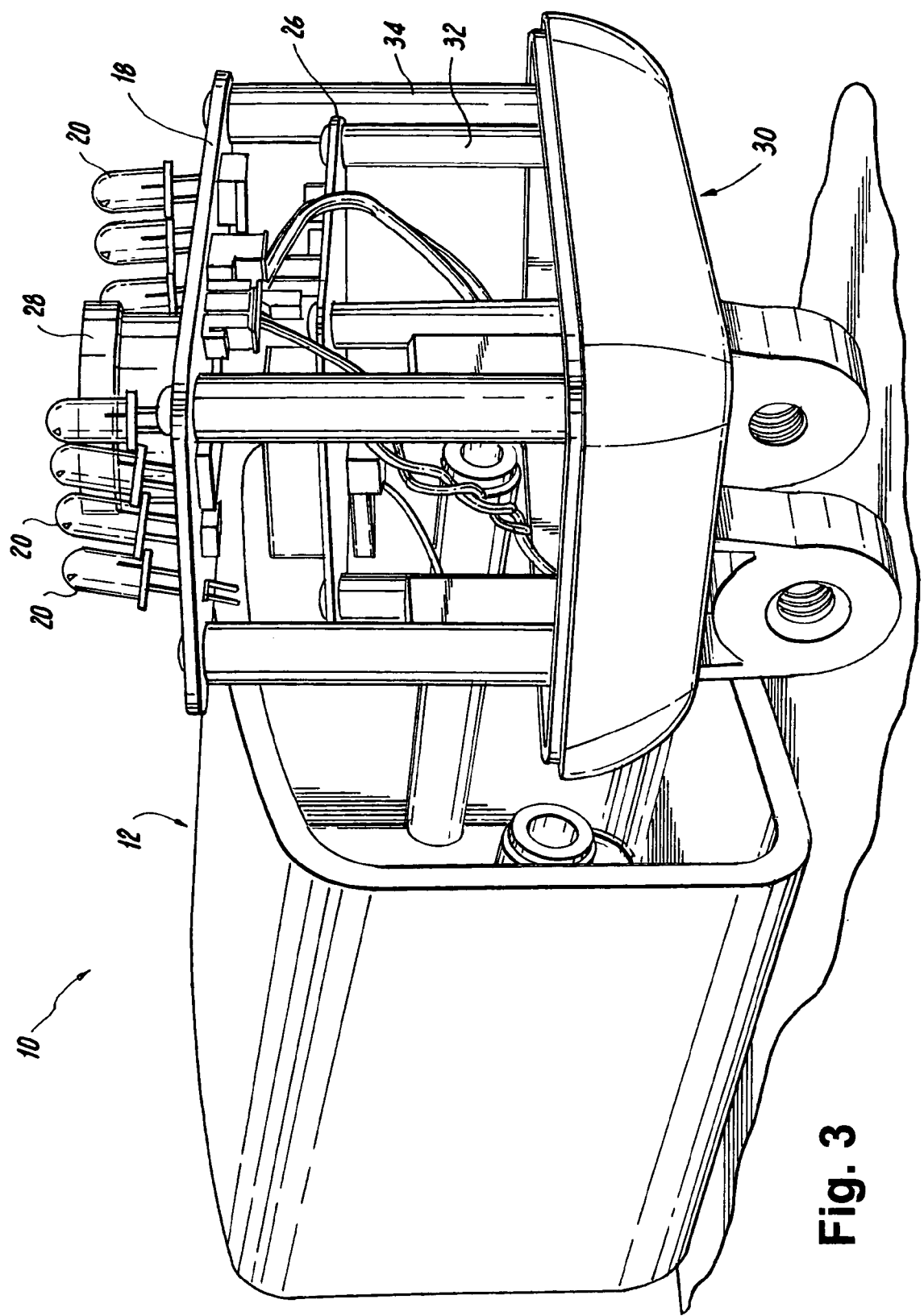
FIG. 3 illustrates the embodiment of FIG. 1 assembled with the enclosure removed.
Figure 4:
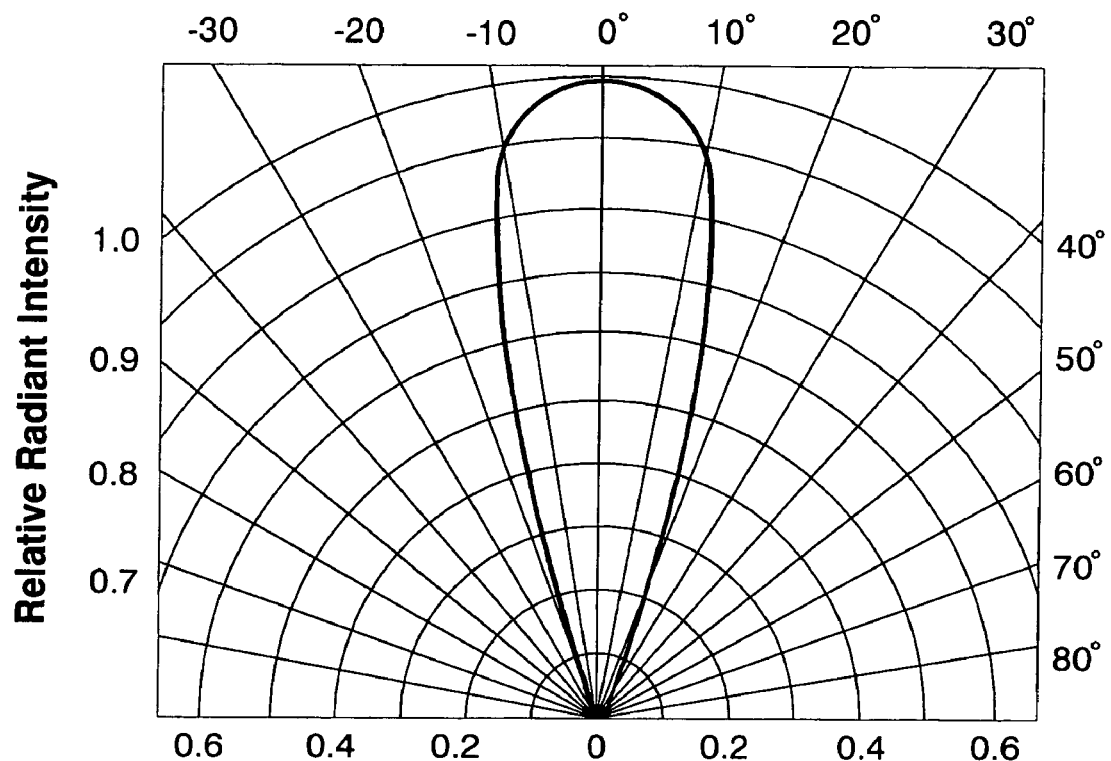
FIG. 4 illustrates a polar plot of relative radiant intensity v. angular displacement for a typical LED illuminator.

Referring now to FIG. 3, shown is the unit 10 illustrated in FIG. 1, assembled except for the enclosure 12, which is removed and shown behind the unit 10. As shown in FIG. 3, each illuminator 20 has a slightly different alignment and therefore different divergence angle ($\gamma$). Varying the alignment of several illuminators 20 can effectively create a wider illumination cone 42 than a single illuminator 20 of equivalent power and cone angle might produce. Such a configuration may also have the benefit of softening and blending the

TABLE 1

|  | Lens Size (mm) | | | | | | | | |
| --- | --- | --- | --- | --- | --- | --- | --- | --- | --- |
|  | 2.9 | 3.6 | 6 | 8 | 12 | 16 | Vari-focal Auto-iris 2.8 - Wide 6.0 - Tele | Vari-focal Auto-iris 4.0 - Wide 9.0 - Tele | Vari-focal Auto-iris 9.0 - Wide 22.0 - Tele |
| Viewing Angle - Horizontal | 90° | 74° | 42° | 32° | 22° | 15° | 81.2° - Wide 43.6° - Tele | 62° - Wide 30° - Tele | 29° - Wide 13° - Tele |
| Viewing Angle - Vertical | 67° | 55° | 32° | 24° | 17° | 11° | 65.5° - Wide 33.4° - Tele | 48.5° - Wide 22.6° - Tele | 21.7° - Wide 9.7° - Tele |
| Relative Aperture | F2.0 | F2.0 | F2.0 | F2.0 | F2.0 | F2.0 | F1.4 | F1.4 | F1.5 | light emitted from the multiple illuminators, useful in further reducing the hotspot phenomenon. Moreover, employing multiple illuminators 20 gives the added benefit of greater tolerance in manufacturing, because the divergence angle (γ) of any one illuminator 20 is not critical provided that the composite divergence angle (γ) is suitable to the application.

As illustrated in FIG. 2, the circular cone 42 representing the area of illumination may be a composite of all illuminators 20 where more than one are used and each have mutually non-parallel illumination axes 44. One could use multiple illuminators to customize the cone of illumination to suit the geometry of the application.

The present invention has been described with respect to certain exemplary embodiments. Certain alterations and modifications will be apparent to those skilled in the art in light of the instant disclosure. These embodiments are means to be illustrative, and not limiting, on the scope of the present invention, which is defined with reference to the appended claims.

The invention claimed is:

1. A surveillance camera and illuminator combination unit comprising:
    an enclosure;
    a surveillance camera disposed within the enclosure and operative to generate images within a predetermined field of view of a surveillance area, the field of view comprising areas of different distance from the camera and illuminator combination unit, the field of view having a central axis; and
    a plurality of infrared illuminators disposed within the enclosure on opposing sides of the surveillance camera each having an illumination axis, each illumination axis being directed towards a different distant portion of the field of view, each illumination axis being non-parallel with the central axis wherein the combined infrared light from the plurality of illuminators forms a cone of illumination that extends outwards from the enclosure along a combined illumination axis that is offset from the central axis and where the cone of illumination has a smaller relative size than the field of view of the surveillance camera.

2. The camera and illuminator combination unit according to claim 1, wherein said plurality of illuminators each comprise an illumination axis, wherein at least one of said plurality of illumination axes are non-parallel with respect to any other of said illumination axes and the illumination axes of the plurality of illuminators are not parallel with the central axis.

3. The camera and illuminator combination unit according to claim 1, wherein said at least one illuminator comprises an illuminator selected from among the group comprising LEDs, incandescent elements, fluorescent elements, and chemiluminescent elements.

4. The camera and illuminator combination unit according to claim 1 wherein said at least one illuminator emits energy in a predetermined portion of the EM spectrum.

5. The camera and illuminator combination unit according to claim 4, wherein said predetermined portion of the EM spectrum comprises the infrared portion of the EM spectrum.

6. The camera and illuminator combination unit according to claim 5, wherein said predetermined portion of the EM spectrum comprises the near-infrared portion of the EM spectrum.

7. The camera and illuminator combination unit according to claim 1, wherein said camera is operative to detect light in a predetermined portion of the EM spectrum.

8. The camera and illuminator combination unit according to claim 7, wherein said predetermined portion of the EM spectrum comprises the near infrared portion of the EM spectrum.

9. The camera and illuminator combination unit according to claim 1, wherein said camera is operative to detect light in a predetermined portion of the EM spectrum, and said at least one illuminator emits light in an intersecting portion of the EM spectrum.

10. The camera and illuminator combination unit according to claim 1, further comprising an enclosure having at least one window admitting light energy to or from said at least one illuminator or said camera.

11. The camera and illuminator combination unit according to claim 10, wherein said window comprises a void of enclosure material.

12. The camera and illuminator combination unit according to claim 10, wherein said window comprises a material transparent to energy within a predetermined portion of the EM spectrum.

13. The camera and illuminator combination unit according to claim 10, wherein said window filters energy outside a predetermined portion of the EM spectrum.

* * * * *

UNITED STATES PATENT AND TRADEMARK OFFICE
CERTIFICATE OF CORRECTION

PATENT NO. : 7,593,056 B2 Page 1 of 1
APPLICATION NO. : 10/974337
DATED : September 22, 2009
INVENTOR(S) : Leonard W. Wubs It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1142 days.

Signed and Sealed this

Twenty-first Day of September, 2010

David J. Kappos
*Director of the United States Patent and Trademark Office*